(12) United States Patent
K-WLam et al.

(10) Patent No.: US 8,828,344 B2
(45) Date of Patent: Sep. 9, 2014

(54) FUEL SYSTEM INERTING

(75) Inventors: Joseph K-WLam, Bristol (GB); Gregory Hylands, Bristol (GB)

(73) Assignee: Airbus Operations Limited, Bristol (GB)

( * ) Notice: Subject to any disclaimer, the term of this patent is extended or adjusted under 35 U.S.C. 154(b) by 293 days.

(21) Appl. No.: 13/464,043

(22) Filed: May 4, 2012

(65) Prior Publication Data

US 2012/0279395 A1 Nov. 8, 2012

(30) Foreign Application Priority Data

May 6, 2011 (GB) .................................. 1107545.4

(51) Int. Cl.
*B01D 53/46* (2006.01)

(52) U.S. Cl.
USPC ............. 423/219; 423/220; 422/187; 95/236

(58) Field of Classification Search
None
See application file for complete search history.

(56) References Cited

U.S. PATENT DOCUMENTS

| 3,847,298 | A | 11/1974 | Hamilton | |
|---|---|---|---|---|
| 6,604,558 | B2 * | 8/2003 | Sauer | ............................... 141/98 |
| 7,815,148 | B2 * | 10/2010 | Kwok | ....................... 244/135 R |

FOREIGN PATENT DOCUMENTS

| GB | 2442309 A | 4/2008 |
|---|---|---|
| JP | 4154499 A | 5/1992 |
| WO | 0228714 A1 | 4/2002 |
| WO | 2007008730 A2 | 1/2007 |

OTHER PUBLICATIONS

Search Report for GB 1107545.4, dated Aug. 23, 2011.

* cited by examiner

*Primary Examiner* — Duane Smith
*Assistant Examiner* — Phillip Shao
(74) *Attorney, Agent, or Firm* — Lowe Hauptman & Ham, LLP (57) ABSTRACT

A fuel system comprising a fuel tank, a catalytic inerting device for producing oxygen depleted air (ODA) by reaction of fuel vapor from the fuel tank with air, and a separator device for separating carbon dioxide from the ODA gas before feeding the carbon dioxide depleted ODA gas to the fuel tank so as to render the fuel tank ullage atmosphere inert. Also, a method of reducing the carbon dioxide content of oxygen depleted air (ODA) produced by a catalytic inerting device for inerting a fuel tank ullage atmosphere, the method comprising separating carbon dioxide from the ODA gas before feeding the carbon dioxide depleted ODA gas to the fuel tank. The system may be installed in an aircraft.

23 Claims, 5 Drawing Sheets

FUEL SYSTEM INERTING

RELATED APPLICATIONS

The present application is based on, and claims priority from, British Application Number 1107545.4, filed May 6, 2011, the disclosure of which is hereby incorporated by reference herein in its entirety.

FIELD OF THE INVENTION

The present invention relates to a fuel system with an inerting device for rendering a fuel tank ullage atmosphere inert, and a corresponding method.

BACKGROUND OF THE INVENTION

Fuel tanks for storing liquid fuel are used, for example, for transporting or storing fuel and on vehicles for their propulsion systems. The volume of gas above the liquid fuel within the fuel tank is known as the ullage. The ullage can contain reactive components, such as oxygen and/or fuel vapours, which can be a potential fire/explosion hazard. The term "inerting" refers to the process of depleting one or more of these reactive components to reduce this potential hazard.

Various inerting systems are known in the art. For example, the potentially explosive atmosphere in the ullage can be displaced by the addition of inert gas, such as argon, nitrogen, or carbon dioxide. Particularly in the case of vehicle fuel systems, the ullage volume increases as the liquid fuel is consumed by the vehicle propulsion system and so the inert gas needs to be added while the vehicle is in motion to dilute or to eliminate ambient air ingress. Typically, the inert gas is either stored in a pressurised tank on the vehicle for use on demand, or generated on board the vehicle for immediate use.

On board generation of inert gas can have several advantages in terms of reduced weight and maintenance requirements, which are important considerations, particularly for the aircraft industry. Some known On Board Inert Gas Generation Systems (OBIGGS) for aircraft pass engine bleed air through a gas separator to produce nitrogen enriched air (NEA), which is fed to the fuel tank ullage. NEA typically has a nitrogen content of between approximately 90% to approximately 98%.

More recently a "Green" OBIGGS, or GOBIGGS system has been proposed (see, for example, WO 2007/008730) takes air and fuel vapour from the ullage and passes these over a hot catalytic bed to oxidize (combust) the fuel vapour to produce oxygen depleted air (ODA). ODA typically has an oxygen content of between approximately 0% to approximately 12%. The ODA inert gas from the GOBIGGS may be fed to the fuel tank but it contains a significant carbon dioxide and water vapour content as the products of combustion.

Water is an unavoidable contaminant in fuel but it can affect fuel system component reliability and lead to operational delays and increased maintenance activities. It is therefore desirable to decrease the water vapour content of the ODA gas before it is fed to the fuel tank ullage. However, there are many sources by which water can enter the fuel tanks. The fuel that is loaded into the tanks will contain some dissolved water, and air that enters the fuel tank via its ventilation system will contain water vapour. Accordingly, some water will inevitably be present within the fuel tanks.

The carbon dioxide within the ODA gas generated by the catalytic inerting system poses a problem because when it dissolves in the water in the fuel tanks it forms carbonic acid, which is corrosive and presents a threat to materials and structures in the fuel tank.

SUMMARY OF THE INVENTION

A first aspect of the invention provides a fuel system comprising a fuel tank, a catalytic inerting device for producing oxygen depleted air (ODA) by reaction of fuel vapour from the fuel tank with air, and a separator device for separating carbon dioxide from the ODA gas before feeding the carbon dioxide depleted ODA gas to the fuel tank so as to render the fuel tank ullage atmosphere inert.

A further aspect of the invention provides a method of reducing the carbon dioxide content of oxygen depleted air (ODA) produced by a catalytic inerting device for inerting a fuel tank ullage atmosphere, the method comprising separating carbon dioxide from the ODA gas before feeding the carbon dioxide depleted ODA gas to the fuel tank.

The invention is advantageous in that by removing at least some of the carbon dioxide from the ODA gas produced by the catalytic inerting device, the problem of carbonic acid forming in the fuel tank and causing damage to the fuel system can be mitigated or overcome.

The separator device may include a condenser comprising a water reservoir and a refrigerating element for cooling water in the reservoir, wherein the condenser is adapted to condense water vapour and scrub carbon dioxide gas from the ODA gas passing through the cooled water. This type of condenser takes advantage of the fact that the amount of carbon dioxide absorbed by water is inversely proportional to temperature. Lowering the temperature of the water in the condenser reservoir increases the amount of carbon dioxide that will be absorbed as the carbon dioxide rich ODA gas passes through the cooled water. The water vapour content of the ODA gas will also be significantly reduced as it will condense out in the cooled water. Therefore, passing the ODA gas through the cooled water will remove both of the problematic components of the ODA gas produced by the catalytic inerting device. The processed ODA gas will comprise predominantly nitrogen will only low levels of other gases. Nitrogen is a very suitable gas for inerting fuel tanks. The condenser further acts to cool the hot ODA gas produced by the catalytic inerting device to make it more suitable for introduction into the fuel tank.

The fuel system may further comprise a conduit adapted to convey relatively warm, moist ODA gas from the catalytic inerting device into the bottom of the water reservoir.

The conduit may have a nozzle opening in the bottom of the water reservoir for forming fine gas bubbles. The fine gas bubbles offer a larger contact surface area with the cooled water such that carbon dioxide will be absorbed and water vapour will condense out at a faster rate. Importantly, the water absorbs much less nitrogen than carbon dioxide (by a factor of an order of magnitude at least), so the nitrogen will bubble through the cooled water whereas the carbon dioxide will be absorbed by the water.

The condenser may include a collection funnel over the water reservoir for collecting relatively cool, dry, carbon dioxide depleted ODA gas that has passed through the cooled water. A conduit may convey the relatively cool, dry, carbon dioxide depleted ODA to the fuel tank.

The cool, dry, carbon dioxide depleted ODA is preferably introduced into the bottom of the fuel tank and bubbled through the fuel. This will dehydrate the fuel and at the same time the fuel will absorb any residual carbon dioxide in the ODA, reducing the threat that carbonic acid will be produced in the fuel tank. The water vapour lifted from the fuel will be extracted in the "air" that is fed from the fuel tank ullage to the catalytic inerting device. The recycling of the ullage atmosphere through the catalytic inerting device and the separator continues until the reactive components (fuel vapour and oxygen) of the ullage atmosphere have been depleted.

The water reservoir may include a fluid overflow path. The water level will generally increase as the water vapour condenses out of the ODA gas. The overflow path may include a float valve. When the water level is high the valve opens. When the water level is low the valve closes.

The refrigeration element may be adapted to be cooled by recirculating fuel from the fuel tank. The fuel in the fuel tank will generally be sufficiently cool to provide the required cooling in the condenser. At the start of operating the condenser, the water reservoir may contain little or no water, particularly if a maintenance drain activity has taken place. Water will condense out of the hot ODA gas passing over the refrigeration element. The condensed water on the refrigeration element may initially provide limited capability to remove carbon dioxide from the ODA gas. Over time, the water will accumulate and with fill up the reservoir to a typical operational level. Once sufficient water has pooled in the reservoir, the carbon dioxide scrubbing will occur to the intended design rate. The fuel temperature should be sufficient to condense but not freeze the water in the hot ODA gas, particularly when the water level in the reservoir is low. The refrigeration element may include cooling fins to improve the cooling efficiency.

If the fuel temperature is too high to provide effective cooling, the refrigeration element may additionally, or alternatively, form part of a vapour-compression refrigeration system.

The separator device preferably further includes an evaporator comprising a water reservoir fluidically coupled to the condenser water reservoir, and a heating element for heating water in the reservoir, wherein the evaporator is adapted to liberate dissolved carbon dioxide gas from the water in the evaporator reservoir. As water passes between the reservoirs, the cool water containing a high concentration of dissolved carbon dioxide will come into contact with the heating element, which will raise the temperature of the water. Since the solubility of carbon dioxide in water is inversely proportional to temperature, carbon dioxide gas will be liberated as the water temperature rises. The separator device with an evaporator therefore can act not only to remove the carbon dioxide from the ODA gas but also to release that carbon dioxide gas via a separate gas stream, allowing the water in the separator device to be recirculated. This saves weight and enables the separator device to be used on a moving vehicle, for example, without a continuous supply of water.

The evaporator water reservoir may include a fluid outlet for ejection of liberated carbon dioxide gas and/or water vapour and/or excess water. The heating element may heat the water sufficiently to boil the water. Water will boil at lower temperatures if the fuel system is operated at higher altitudes, e.g. on board an aircraft. An equilibrium may be reached whereby the formation of liquid water in the condenser is at the same rate as removal of liquid water in the evaporator. The steam/water vapour/liquid water may be ejected at a sufficiently high temperature that freezing does not occur in the fluid outlet even when operated at sub-zero ambient temperatures. This is particularly beneficial on an aircraft where it is generally desirable to avoid icing. The fluid outlet may include a valve to prevent loss of water due to sloshing. The valve may be a pendulum valve, for example.

The heating element is adapted to be heated by the heat of combustion generated by the catalytic inerting device. The evaporator provides a useful heat sink for the waste heat generated by the catalytic inerting device. At the start of operation of the separator, the level of water in the evaporator may be low and so a separate heat sink may additionally be required for the catalytic inerting device. The catalytic inerting device will cease to generate heat when the combustion of all reactive components in the fuel tank ullage is complete. However, the catalytic inerting device will necessarily stop producing ODA gas at this time, and so the evaporator will automatically stop when the catalytic inerting device stops. This functional link between the catalytic inerting device and the separator is a particular benefit since the system can be operated with minimal control.

The bottom of the condenser water reservoir is preferably situated higher than the bottom of the evaporator water reservoir. In this way, the cool water rich in carbon dioxide will naturally flow to the evaporator.

The evaporator water reservoir and the condenser water reservoir are preferably two sections of a common reservoir. Using a common reservoir reduces complexity and pipework and encourages natural convention flows to move the cool carbon dioxide rich water to the evaporator, and to move the warm carbon dioxide lean water to the condenser.

The common reservoir may have an inclined roof to encourage outgas to flow towards to the evaporator side.

The common reservoir may have an inclined floor to encourage cool water to flow to the evaporator side.

The common reservoir may include a baffle between the evaporator and condenser sections, and the baffle preferably includes thermally insulating material. The baffle helps increase the regeneration efficiency of the condenser-evaporator.

Alternatively, the evaporator water reservoir and the condenser water reservoir may be fluidically coupled by an upper conduit extending between the upper parts of the reservoirs and a lower conduit extending between the lower parts of the reservoirs. By providing the condenser and evaporator as separate reservoirs, the temperature differential between the condenser and evaporator can be increased leading to improved regeneration efficiency. A pump may be required to move the water between the two reservoirs.

In one embodiment, the fuel system is installed in an aircraft. The catalytic inerting device is preferably disposed in a vent/surge tank adjacent the fuel tank, but may alternatively be disposed in the fuel tank. The vent/surge tank is typically located at the wing tip of large commercial jet aircraft but may alternatively be provided in the belly fairing adjacent the aircraft fuselage. The separator may be disposed in the vent/surge tank or the fuel tank. When the separator comprises a condenser-evaporator, the condenser may be disposed in the fuel tank and the evaporator may be disposed in the vent/surge tank. Siting the condenser in the fuel tank may be beneficial as it will be submerged in cold fuel throughout the majority of the cruise portion of the aircraft flight. The baffle or separation between the condenser and evaporator sides of the separator may be disposed at the fuel tank/vent tank boundary wall, and may make use of the boundary wall structure.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
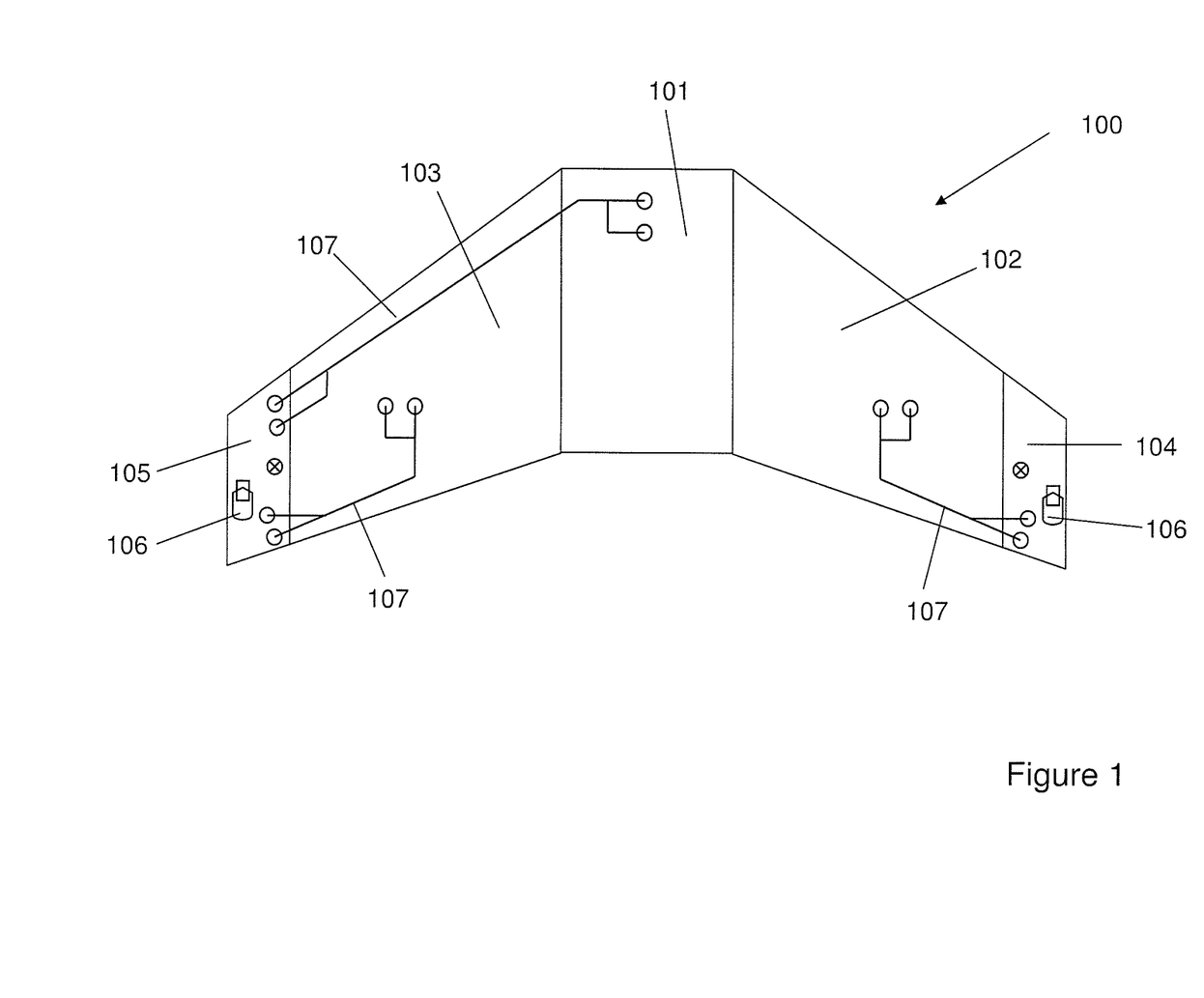
FIG. 1 illustrates schematically an aircraft wing fuel tank arrangement.

FIG. 1 illustrates a general wing fuel tank architecture 100 of an aircraft having a three-tank configuration. The fuel tank architecture 100 includes a centre fuel tank 101, a right wing fuel tank 102, and a left wing fuel tank 103. The fuel tanks 101, 102 and 103 are ventilated by means of wing tip vent tanks 104, 105 each having a NACA duct assembly 106 including a NACA vent, or NACA scoop, which opens to the ambient atmosphere on the lower aerodynamic surface of the aircraft wing. The right vent tank 104 ventilates the right wing fuel tank 102, and the left vent tank 105 ventilates the left and centre wing fuel tanks 101, 103. The vent tanks 104, 105 are coupled by ventilation lines 107 to the fuel tanks 101, 102, 103.

Figure 2:
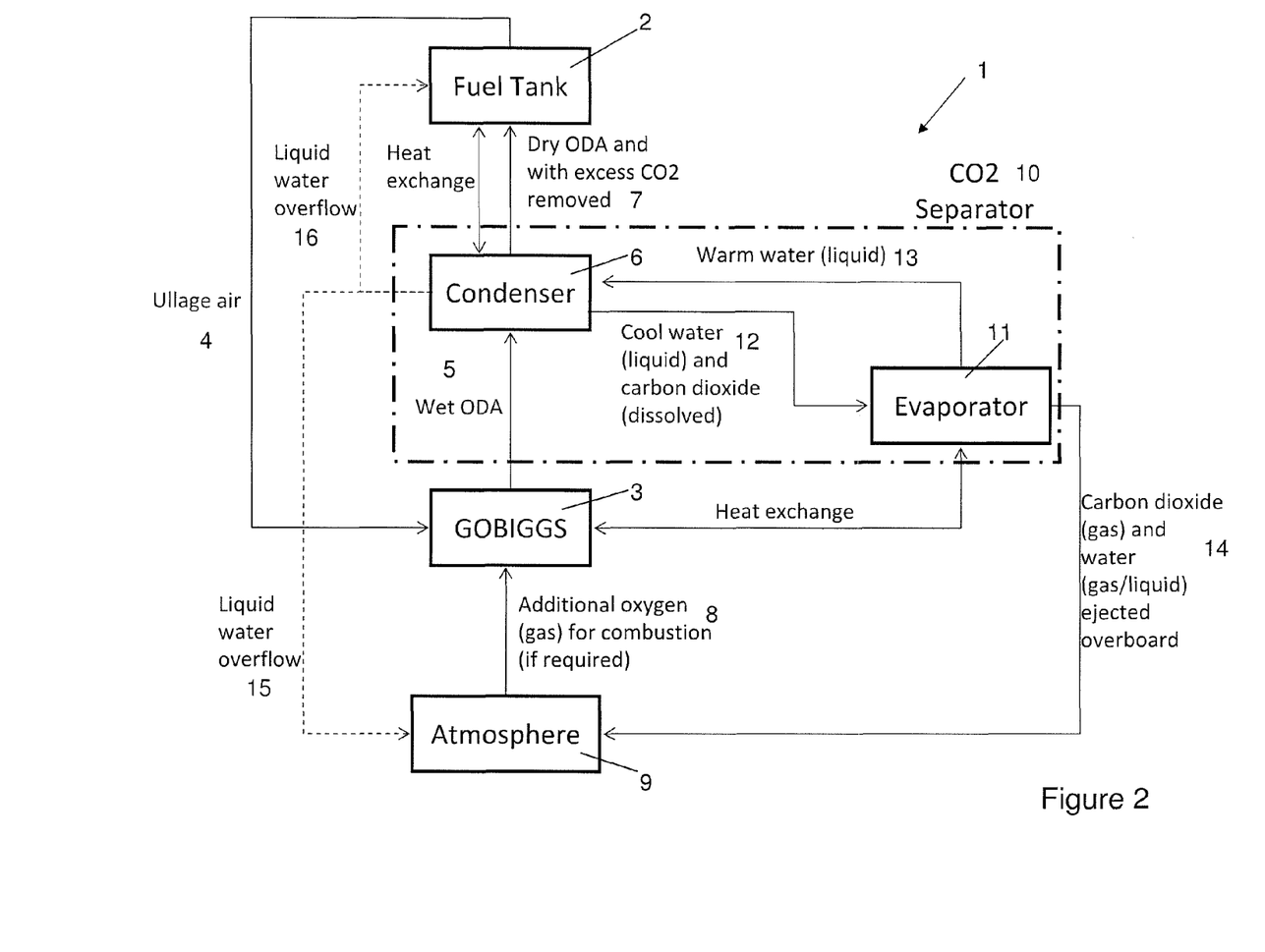
FIG. 2 illustrates a block diagram of a fuel system including a GOBIGGS arranged in a recirculation loop with the aircraft fuel tank(s) for inerting the fuel tank ullage and with a carbon dioxide separator disposed downstream of the GOBIGGS.

FIG. 2 illustrates a block diagram of a fuel system 1 for inerting and dehydrating a fuel tank such as, for example, the aircraft wing fuel tank architecture 100 shown in FIG. 1. The fuel system 1 may alternatively be used with a variety of different vehicles.

The fuel system 1 includes a fuel tank 2 and a "GOBIGGS" catalytic inerting device 3. The GOBIGGS 3 is configured to process ullage air 4 from the fuel tank 2. The ullage air 4 may include reactive components, such as oxygen and/or fuel vapours, which can be a potential fire/explosion hazard. The GOBIGGS 3 passes the oxygen and fuel vapours in the ullage air 4 over a hot catalytic bed to oxidise (combust) the fuel vapours.

The resultant "wet" oxygen depleted air (ODA) 5 contains a significant carbon dioxide and water vapour content as the products of combustion. The wet ODA 5 is fed to a separator device 10 comprising a condenser 6 which separates carbon dioxide and water from the wet ODA 5 so as to produce relatively dry carbon dioxide depleted ODA gas 7. The dry carbon dioxide depleted ODA 7 is returned to the fuel tank 2.

By continuously circulating the ullage air 4 from the fuel tank 2 through the GOBIGGS 3 and the condenser 6 the fuel vapour and oxygen content of the fuel tank ullage is progressively diminished rendering the fuel tank ullage atmosphere inert. It is known that once the oxygen content of the ullage atmosphere becomes less than approximately 12 percent then the ullage atmosphere is rendered effectively inert.

In order for the GOBIGGS 3 to efficiently combust fuel vapours in the ullage air 4, additional oxygen 8 may occasionally be required and is readily available from the ambient atmosphere 9.

The condenser 6 will be described in greater detail with reference to FIGS. 3 to 5 but essentially comprises a water reservoir with a refrigerating element for cooling the water in the reservoir. The wet ODA 5 will be relatively hot due to the heat of combustion from operating the GOBIGGS 3. The cold water condenser 6 acts not only to condense water vapour in the wet ODA gas 5 but also to scrub carbon dioxide gas from the wet ODA 5 passing through the cold water. The condenser 6 makes use of the fact that the amount of carbon dioxide absorbed by water is inversely proportional to temperature. The excess carbon dioxide in the wet ODA gas 5 will therefore be absorbed as the wet ODA gas 5 bubbles through the cold water in the condenser 6.

The dry carbon dioxide depleted ODA gas 7 will comprise predominantly nitrogen with only low levels of other gases. Importantly, cold water absorbs much less nitrogen than carbon dioxide (by a factor of an order of magnitude at least) so the nitrogen will bubble through the cold water whereas the carbon dioxide will be absorbed by the water.

The dry carbon dioxide depleted ODA gas 7 may be fed directly to the ullage of the fuel tank 2 but is preferably introduced into the bottom of the fuel tank 2 via an outlet submerged in the liquid fuel. The dry ODA gas 7 injected into the fuel forms bubbles, which rise through the fuel, and diffusion of dissolved water from the fuel into the gas occurs until equilibrium is reached. By reducing the concentration of dissolved water in the fuel, there is a reduction in the amount of water that can precipitate out of the fuel due to, for example, a decrease in fuel temperature. The dry ODA gas 7 is relatively drier than the fuel. The dry ODA gas 7 is preferably cooled by the condenser 6 to a temperature of between approximately 30° C. to approximately 40° C., although temperatures higher or lower than this range may also be suitable.

The water lifted from the fuel by bubbling the dry ODA gas 7 through the fuel in fuel tank 2 is recirculated in the ullage air 4 that is fed to the catalytic inerting device 3 and via the condenser 6, which removes the water.

Accordingly, the fuel system 1 acts to effectively inert the fuel tank ullage whilst simultaneously reducing the water content within the fuel tank 2 and suppressing or inhibiting the formation of carbonic acid by controlling the carbon dioxide to a low level.

The refrigerating element in the condenser 6 is thermally coupled to fuel in the fuel tank 2 such that heat exchange occurs between the fuel in fuel tank 2 and the condenser 6. Due to the sub-zero ambient temperatures typically observed during the cruise portion of an aircraft flight the fuel in an aircraft fuel tank will often be cold when the GOBIGGS 3 is operating. This provides a useful source of cooling for the condenser 6.

The separator 10 further includes an evaporator 11. The evaporator 11 includes a warm water reservoir and a heating element. The warm water reservoir in the evaporator and the cold water reservoir in the condenser 6 are fluidically coupled. Cool water 12 containing a relatively high dissolved carbon dioxide content flows from condenser 6 to evaporator 11 where the higher temperature of the warm water reservoir liberates the dissolved carbon dioxide in gaseous form. As mentioned previously, since the solubility of carbon dioxide in water is inversely proportional to temperature, carbon dioxide gas will be released in the evaporator 11 from the water.

Warm water 13 flows from the evaporator 11 to the condenser 6 where it is cooled ready to absorb carbon dioxide once again from the wet ODA gas 5. In this way, water is continuously circulated from the condenser 6 to the evaporator 11 and vice versa in the separator 10. The heating element within the evaporator 11 is thermally coupled to the GOBIGGS 3 such that the heat of combustion generated in the catalytic inerting device 3 is used to heat the water in the warm water reservoir in the evaporator 11.

The carbon dioxide gas and water vapour which evaporates from the warm water reservoir in the evaporator 11 is ejected from the fuel system 1 to the ambient atmosphere 9. If the rate at which liquid water is condensed in the condenser 6 is greater than the rate of evaporation of water vapour by the evaporator 11 then the water level within the separator 10 will increase. Excess liquid water is also ejected to the ambient atmosphere 9 in fluid stream 14 with the carbon dioxide gas and water vapour. Excess liquid water may also be removed from the condenser 6 via overflow path 15 to the ambient atmosphere 9 or via overflow path 16 into the fuel tank 2.

Figure 3:
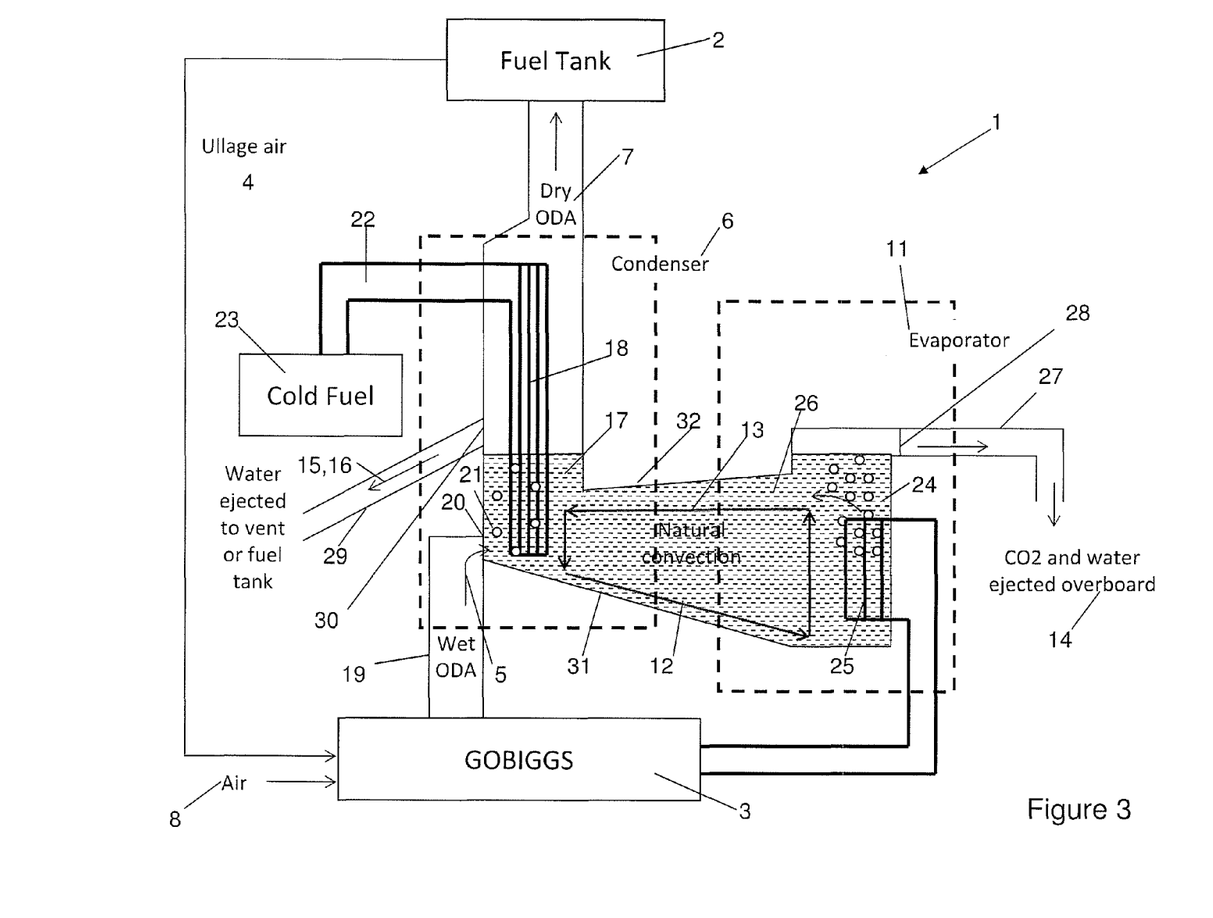
FIG. 3 illustrates schematically an embodiment of the fuel system in which the carbon dioxide separator includes a common condenser-evaporator water reservoir.

FIG. 3 illustrates further detail of the fuel system 1. The condenser 6 includes a cold water reservoir 17 and a refrigerating element 18 for cooling the water in the reservoir 17. The wet ODA 5 from GOBIGGS 3 is conveyed by a conduit 19 into the bottom of the cold water reservoir 17. The conduit 19 has a nozzle 20 which opens into the bottom of the water reservoir 17. The nozzle 20 forms fine gas bubbles 21 which rise up through the cold water in reservoir 17. The fine bubbles 21 have a relatively large contact area with the water. Since the wet ODA 5 is bubbled through the water, rather than injected into the condenser above the water line, the surface area of the fine bubbles is relatively larger than the surface area of the condenser.

The refrigerating element includes a plurality of cooling fins which offer a large surface area in contact with water in the reservoir 17 so as to improve cooling efficiency. The refrigerating element 18 is fed by a fuel line 22 by a source of cold fuel 23 which is preferably pumped from fuel tank 2. The fuel temperature through the fuel line 22 is selected such that even when the water reservoir 17 is empty (following a maintenance drain operation, for example) the wet ODA gas 5 flowing past the refrigerating element will not freeze on the refrigerating element surface.

The cold water in reservoir 17 will tend to absorb carbon dioxide in the wet ODA gas 5 at a much faster rate than it will absorb nitrogen gas since the solubility of carbon dioxide in cold water is at least an order of magnitude greater than the solubility of nitrogen at the operational temperature of reservoir 17. The solubility of both carbon dioxide and nitrogen in water is inversely proportional to temperature. As a result, nitrogen gas will tend to bubble through the water whereas carbon dioxide gas will tend to be absorbed by the water. Water vapour in the wet ODA gas 5 will tend to condense and accumulate in cold water reservoir 17.

If the temperature of the fuel in fuel pipe 22 used to cool the refrigerating element 18 is insufficiently cool then an additional backup cooling system may be used, such as a vapour-compression refrigeration system, for cooling the refrigeration element 18.

The evaporator 11 includes a warm water reservoir 24 and a heating element 25 for heating the water in the reservoir 24. The warm water reservoir 24 is fluidically coupled to the cold water reservoir 17 and the condenser 6. In the embodiment depicted in FIG. 3, the warm water reservoir 24 and the cold water reservoir 17 form part of a single common reservoir 26. Cold water flows from the cold water reservoir 17 carried by natural convection currents in the reservoir 26 to the warm water reservoir 24. The cold water 12, carrying a relatively high concentration of dissolved carbon dioxide, therefore heats up in the evaporator 11 and will release carbon dioxide gas and water vapour. The heating element 25 is thermally coupled to the GOBIGGS 3 such that heat for the evaporator will be provided by GOBIGGS 3 during operation. The larger the temperature difference of the water between the condenser reservoir 17 and the evaporator reservoir 24 the more carbon dioxide will be released.

At cruise altitude, where the ambient air pressure is lower, the boiling point of water is also lower so some water may be boiled and generate steam in the evaporator 11. The carbon dioxide gas, water vapour and steam generated by the evaporator 11 together with any excess water which accumulates in the common reservoir 26 due to condensation of the wet ODA gas 5 will be ejected overboard through the aircraft vent system as fluid stream 14. The water will be warm enough to be ejected without freezing in the vent system.

The ejection line 27 includes a pendulum valve 28 to prevent loss of water from the evaporator reservoir 24 due to sloshing. The valve opens when the evaporator 11 is horizontal or tilted anti-clockwise (as perceived in FIG. 3) and the valve 28 closes when the evaporator 11 is tilted clockwise (as perceived in FIG. 3). The condenser 6 also includes an overflow path 29 in the wall of the cold water reservoir 17 and is provided with a float valve 30 which opens when the water level is high and closes when then water level is low. The float valve 30 prevents a build up of water in the condenser 6 due to blockage in the ejection line 27 at the evaporator 11.

The common reservoir 26 which incorporates the cold water reservoir 17 and the warm water reservoir 24 includes a inclined floor 31 to encourage the cool water from the condenser 6 to migrate towards the evaporator 11 by gravity to assist the natural convection currents. As the warm water current rises in the warm water reservoir 24 it releases the super-saturated carbon dioxide as it nears the free surface of the evaporator reservoir 24 and is then carried by the convection currents back towards the condenser 6. The returning water is regenerated in terms of carbon dioxide absorption. In this way, the water is able to absorb carbon dioxide again along with the newly condensed water in the condenser 6 and will continue to circulate/regenerate as described above.

The roof 32 of the common reservoir 26 is slightly inclined upwardly towards the evaporator 11 so as encourage late carbon dioxide outgas to flow towards the evaporator side.

The fuel system 1 includes several failsafe measures to ensure continued operation of the fuel system. If there is no water in the water reservoirs 17, 24 initially then the warm wet ODA gas 5 from the GOBIGGS 3 will be cooled by the refrigeration element 18 and water vapour will condense on the refrigeration element surface.

Whilst carbon dioxide removal from the wet ODA gas 5 will be impaired, the water which condenses on the refrigeration element surface will provide a limited capability to remove carbon dioxide from the wet ODA gas stream 5. Over time, water which condenses on the radiator will fall to the bottom of the water reservoirs 17, 24 and will fill up the water reservoirs to their normal operating level.

Excess water in the water reservoirs 17, 24 will be removed through the ejection path 27 or, if blocked, via overflow path 29 by opening the float valve 30. The water 15 ejected from overflow path 29 may be ejected either into the fuel tank 2 or overboard into the ambient atmosphere via the fuel tank vent system. Since the water in the overflow path 29 is from the cold water reservoir 17 it may be susceptible to freezing in the vent system which may reduce the aerodynamic efficiency of the wing. However, this failure may be sufficiently rare that this may be favourable to the alternative of introducing excess water into the fuel tank 2.

Whilst the aircraft is on the ground, or operating in hot climates, the temperature of the fuel available for pumping through the refrigeration element 18 may be at too higher temperature. This will impair the condenser efficiency and the ability of the condenser 6 to remove water vapour and carbon dioxide from the wet ODA gas 5 will be reduced. However, the wet ODA gas 5 will still be inert and the carbon dioxide will be absorbed by the fuel in the fuel tank 2 as it is bubbled through the fuel in the manner described previously. The fuel in the fuel tank 2 will cool once the aircraft has ascended to cruise altitude and the normal condenser efficiency will be resumed whereby the excess carbon dioxide gas and water vapour in the fuel tank ullage air 4 will eventually be reduced. Importantly, the reduction in condenser efficiency has no effect on the ability of GOBIGGS 3 to create an inert ullage atmosphere in fuel tank 2.

If the heating element 25 is unable to effectively receive heat from the GOBIGGS 3 then carbon dioxide gas will cease to be liberated in the evaporator 11. Once the water in the water reservoirs 17, 24 become super-saturated, the residual carbon dioxide in the dry ODA gas 7 which enters the fuel tank from the condenser 6 will increase. The condensate from the wet ODA gas 5 will increase the water level in the reservoirs 17, 24 and excess water will be ejected via ejection line 27 along with any carbon dioxide dissolved in that water. In exceptional circumstances, the lack of a heat source may cause water in the reservoir to freeze and so the reservoirs are designed to accommodate ice expansion without damaging the unit. Once the heat source becomes available again, the ice will melt and the condenser 6 and the evaporator 11 will continue to function normally.

If the condenser dry ODA gas outlet becomes blocked, pressure in the condenser 6 will build up and displace liquid water out of the ejection line 27. When the water level in the cold water reservoir 17 falls to the level of the connection between the condenser 6 and the evaporator 11, slugs of gas will escape periodically from the condenser 6 to the evaporator 11 and then be ejected overboard via the ejection line 27.

If the ejection line 27 becomes blocked, pressure in the evaporator 11 will build up and displace water in the evaporator reservoir 24 downward on the evaporator side. When the water level in the evaporator is at the same level as the connection between the condenser 6 and the evaporator 11, slugs of gas will escape periodically from the evaporator into the condenser and then to the fuel tank ullage. Water will continue to accumulate in the condenser 6 until the float valve 30 opens to release the excess water along overflow path 29 to either the fuel tank or to the vent tank via overflow paths 15 or 16.

Figure 4:
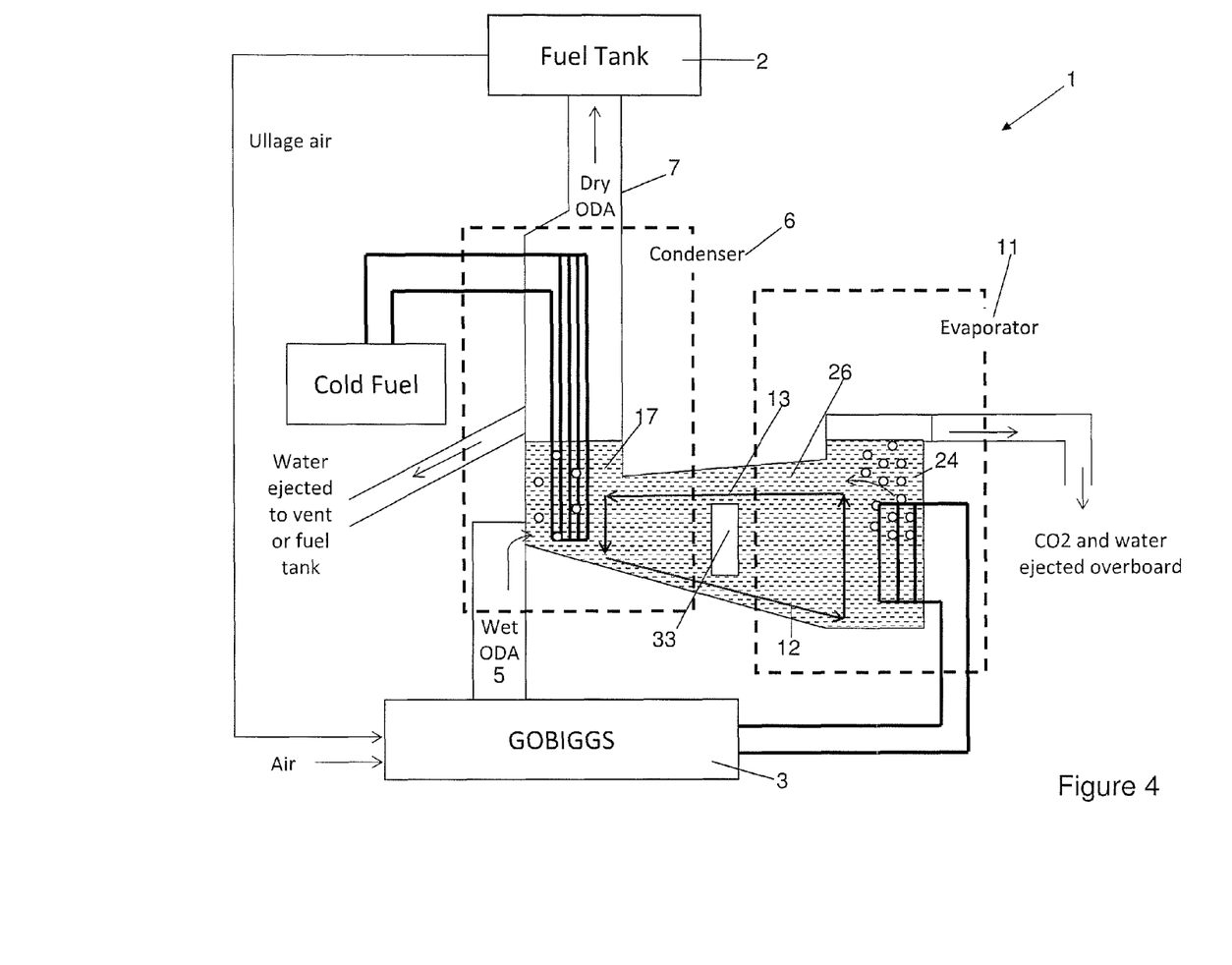
FIG. 4 illustrates schematically an alternative embodiment of the fuel system in which the common condenser-evaporator reservoir includes a baffle.

FIG. 4 illustrates an alternative embodiment of the fuel system in which a baffle 33 is additionally installed in the common reservoir 26 between the condenser 6 and the evaporator 11. The baffle 33 is preferably constructed of non-heat conducting material and is provided to increase the heat differentiation between the condenser to improve the regeneration efficiency of the carbon dioxide separator 10.

Figure 5:
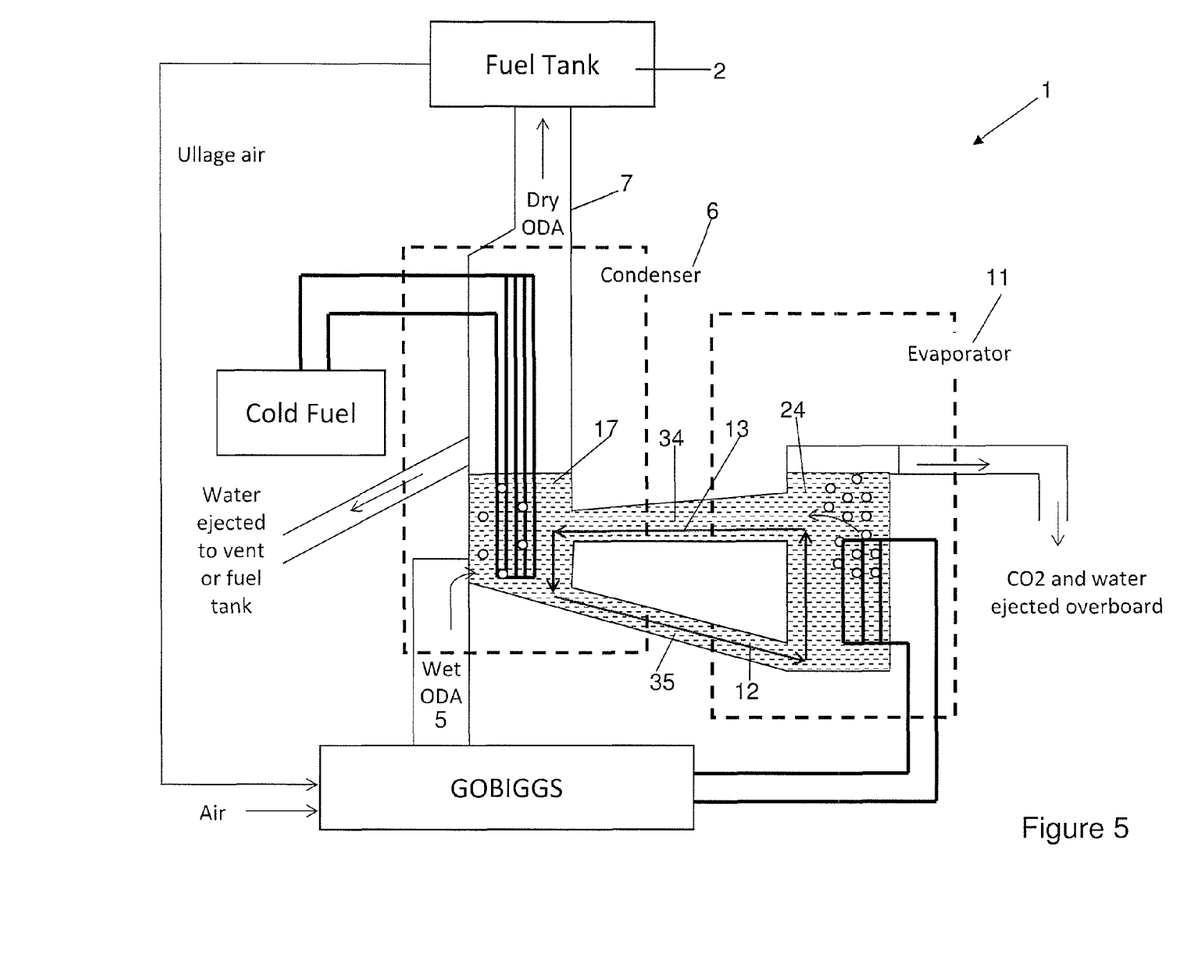
FIG. 5 illustrates schematically a further alternative embodiment of the fuel system including a carbon dioxide separator with distinct condenser and evaporator reservoirs connected by pipes.

FIG. 5 illustrates a further alternative embodiment of the fuel system in which the condenser reservoir 17 and the evaporator reservoir 22 are two separate vessels connected by an upper pipe 34 and a lower pipe 35. This reduces the amount of water carried between the condenser 6 and the evaporator 11 and increases the regeneration efficiency by providing a higher thermal gradient between the evaporator 11 and the condenser 6. In all other respects, the fuel systems shown in FIGS. 4 and 5 are identical to that described above with reference to FIGS. 2 and 3.

Referring once again to FIG. 1, the GOBIGGS 3 is preferably installed in the vent tanks 104, 105 as the additional oxygen 8 which may be required is available without any associated pipework. Alternatively, the GOBIGGS 3 may be installed within the fuel tanks 102, 103. The condenser 6 is preferably installed in the fuel tanks 102, 103 as the cold fuel 23 for cooling the condenser is available there within minimal pipework. The evaporator 11 may be installed in either the vent tanks 104, 105 or the fuel tanks 102, 103. Particularly in the case of the embodiments described above with reference to FIGS. 4 and 5 it would be beneficial to install the condenser 6 and evaporator1 1 on either side the fuel tank/vent tank boundary. This boundary may provide a useful natural separation between the warm water and cold water reservoirs.

Although the invention has been described above with reference to one or more preferred embodiments, it will be appreciated that various changes or modifications may be made without departing from the scope of the invention as defined in the appended claim.

The invention claimed is:

1. A fuel system comprising a fuel tank, a catalytic inerting device for producing oxygen depleted air (ODA) by reaction of fuel vapour from the fuel tank with air, and a separator device for separating carbon dioxide from the ODA gas before feeding the carbon dioxide depleted ODA gas to the fuel tank so as to render the fuel tank ullage atmosphere inert.

2. A fuel system according to claim 1, wherein the separator device includes a condenser comprising a water reservoir and a refrigerating element for cooling water in the reservoir, wherein the condenser is adapted to condense water vapour and scrub carbon dioxide gas from the ODA gas passing through the cooled water.

3. A fuel system according to claim 2, further comprising a conduit adapted to convey relatively warm, moist ODA gas from the catalytic inerting device into the bottom of the water reservoir.

4. A fuel system according to claim 3, wherein the conduit has a nozzle opening in the bottom of the water reservoir for forming fine gas bubbles.

5. A fuel system according to claim 2, wherein the condenser further includes a collection funnel over the water reservoir for collecting relatively cool, dry, carbon dioxide depleted ODA gas that has passed through the cooled water.

6. A fuel system according to claim 5, further comprising a conduit adapted to convey the relatively cool, dry, carbon dioxide depleted ODA to the fuel tank.

7. A fuel system according to claim 2, wherein the water reservoir includes a fluid overflow path.

8. A fuel system according to claim 2, wherein the refrigeration element is adapted to be cooled by recirculating fuel from the fuel tank.

9. A fuel system according to claim 2, wherein the refrigeration element forms part of a vapour-compression refrigeration system.

10. A fuel system according to claim 2, wherein the separator device further includes an evaporator comprising a water reservoir fluidically coupled to the condenser water reservoir, and a heating element for heating water in the reservoir, wherein the evaporator is adapted to liberate dissolved carbon dioxide gas from the water in the evaporator reservoir.

11. A fuel system according to claim 10, wherein the evaporator water reservoir includes a fluid outlet for ejection of liberated carbon dioxide gas and/or water vapour and/or excess water.

12. A fuel system according to claim 10, wherein the heating element is adapted to be heated by the heat of combustion generated by the catalytic inerting device.

13. A fuel system according to claim 10, wherein the bottom of the condenser water reservoir is situated higher than the bottom of the evaporator water reservoir.

14. A fuel system according to claim 10, wherein the evaporator water reservoir and the condenser water reservoir are two sections of a common reservoir.

15. A fuel system according to claim 14, wherein the common reservoir has an inclined roof to encourage outgas to flow towards to the evaporator side.

16. A fuel system according to claim 14, wherein the common reservoir has an inclined floor to encourage cool water to flow to the evaporator side.

17. A fuel system according to claim 14, wherein the common reservoir includes a baffle between the evaporator and condenser sections, and the baffle preferably includes thermally insulating material.

18. A fuel system according to claim 10, wherein the evaporator water reservoir and the condenser water reservoir are fluidically coupled by an upper conduit extending between the upper parts of the reservoirs and a lower conduit extending between the lower parts of the reservoirs.

19. An aircraft including the fuel system of claim 1.

20. A method of reducing the carbon dioxide content of oxygen depleted air (ODA) produced by a catalytic inerting device for inerting a fuel tank ullage atmosphere, the method comprising separating carbon dioxide from the ODA gas before feeding the carbon dioxide depleted ODA gas to the fuel tank.

21. A method according to claim 20, wherein the separating step includes passing the ODA gas through cooled water so as to condense water vapour and scrub carbon dioxide gas from the ODA gas.

22. A method according to claim 21, wherein the separating step further includes liberating the carbon dioxide by subsequently heating the water.

23. A method according to claim 20 performed onboard an aircraft.

* * * * *